US009705330B1

(12) United States Patent
Yetter

(10) Patent No.: US 9,705,330 B1
(45) Date of Patent: *Jul. 11, 2017

(54) SYSTEM, METHOD AND APPARATUS FOR MONITORING AND CONTROLLING ELECTRICAL POWER USAGE

(71) Applicant: Best Energy Reduction Technologies, LLC, King of Prussia, PA (US)

(72) Inventor: Scott J. Yetter, Philadelphia, PA (US)

(73) Assignee: Best Energy Reduction Technologies, LLC, King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,704

(22) Filed: Apr. 28, 2016

Related U.S. Application Data

(63) Continuation of application No. 13/772,337, filed on Feb. 21, 2013, now Pat. No. 9,331,524, which is a continuation-in-part of application No. 13/269,531, filed on Oct. 7, 2011, now abandoned, and a continuation-in-part of application No. 13/162,564, filed on Jun. 16, 2011, now Pat. No. 8,093,751, which is a continuation of application No. 12/878,040, filed on Sep. 9, 2010, now Pat. No. 7,964,989.

(60) Provisional application No. 61/391,663, filed on Oct. 10, 2010, provisional application No. 61/361,402, filed on Jul. 3, 2010.

(51) Int. Cl.
*H02J 3/14* (2006.01)
*H02J 13/00* (2006.01)

(52) U.S. Cl.
CPC ............ *H02J 3/14* (2013.01); *H02J 13/0075* (2013.01)

(58) Field of Classification Search
CPC ...... H02J 13/0006; H02J 13/0075; H02J 3/14; G06F 1/266; H01R 25/003; Y02B 70/3225; Y04S 20/222; Y10T 307/461
See application file for complete search history.

(56) References Cited

U.S. PATENT DOCUMENTS

| | | | | |
|---|---|---|---|---|
| 5,268,666 A * | 12/1993 | Michel | ............... | H02J 13/0017 340/12.33 |
| 5,880,677 A * | 3/1999 | Lestician | ............... | G01D 4/004 307/17 |
| 6,518,980 B1 * | 2/2003 | DeMotte | ............... | B25J 9/1656 700/9 |
| 6,735,705 B1 * | 5/2004 | Egbert | ............... | G06F 1/266 713/300 |
| 7,106,014 B1 * | 9/2006 | Mastalir | ............... | A47B 19/06 108/44 |
| 7,117,323 B1 * | 10/2006 | Delaney | ............. | G06F 11/1004 711/162 |
| 7,482,708 B1 * | 1/2009 | Barton | ............... | G06F 1/266 307/30 |

(Continued)

*Primary Examiner* — Orlando Bousono
(74) *Attorney, Agent, or Firm* — Clause Eight IPS; Michael Catania

(57) ABSTRACT

A system and method for remotely monitoring, measuring and controlling power to furniture having an electrically powered feature is disclosed herein. The furniture is preferably modular furniture (such as a cubicle) and the electrically powered feature is at least one of lighting or a power outlet. Alternatively, the furniture is a lectern and the electrically powered feature is at least one of lighting or a power outlet. Alternatively, the furniture is a charging cart and the electrically powered feature is at least one of lighting or a power outlet.

3 Claims, 11 Drawing Sheets

(56) References Cited

U.S. PATENT DOCUMENTS

| | | | |
|---|---|---|---|
| 2002/0010518 A1* | 1/2002 | Reid | G06Q 10/087 700/31 |
| 2002/0043960 A1* | 4/2002 | Janik | G06F 1/1632 320/128 |
| 2003/0042796 A1* | 3/2003 | Siu | G06F 1/266 307/39 |
| 2003/0103304 A1* | 6/2003 | Rendic | G06F 1/266 361/90 |
| 2003/0126253 A1* | 7/2003 | Ewing | G06F 1/26 709/223 |
| 2003/0164787 A1* | 9/2003 | Dresti | G08C 17/00 341/176 |
| 2004/0024913 A1* | 2/2004 | Ikeda | H04B 3/54 709/249 |
| 2004/0046677 A1* | 3/2004 | Dresti | G08C 17/00 340/12.28 |
| 2004/0073847 A1* | 4/2004 | Booth | H04L 1/24 714/43 |
| 2004/0107717 A1* | 6/2004 | Yoon | F24F 11/006 62/230 |
| 2005/0020232 A1* | 1/2005 | Bonicatto | H04B 3/54 455/402 |
| 2005/0055472 A1* | 3/2005 | Krzyzanowski | H04L 12/2803 710/5 |
| 2005/0101193 A1* | 5/2005 | Godard | H01R 25/00 439/652 |
| 2005/0162282 A1* | 7/2005 | Dresti | G05B 15/02 340/12.3 |
| 2005/0206241 A1* | 9/2005 | Saxena | H02J 9/06 307/66 |
| 2006/0039102 A1* | 2/2006 | Lai | H01R 13/7036 361/641 |
| 2006/0114360 A1* | 6/2006 | Kortum | H04N 5/63 348/730 |
| 2006/0273663 A1* | 12/2006 | Emalfarb | H02H 3/12 307/126 |
| 2007/0008076 A1* | 1/2007 | Rodgers | H02J 3/14 700/295 |
| 2007/0030093 A1* | 2/2007 | Gerszberg | H04B 3/542 333/109 |
| 2007/0115695 A1* | 5/2007 | Lou | H02M 3/1582 363/16 |
| 2007/0121260 A1* | 5/2007 | Sullivan | H01H 83/04 361/42 |
| 2007/0141869 A1* | 6/2007 | McNeely | A61B 5/0006 439/76.1 |
| 2007/0214815 A1* | 9/2007 | Lewkowitz | F25B 27/002 62/235.1 |
| 2007/0297112 A1* | 12/2007 | Gilbert | G06F 1/266 361/91.5 |
| 2008/0015740 A1* | 1/2008 | Osann | G05B 15/02 700/276 |
| 2008/0100140 A1* | 5/2008 | Sorenson | H02J 13/0062 307/40 |
| 2008/0117077 A1* | 5/2008 | Ratiu | G01D 4/004 340/870.02 |
| 2008/0140565 A1* | 6/2008 | DeBenedetti | G06Q 20/10 705/39 |
| 2008/0183316 A1* | 7/2008 | Clayton | G05B 19/042 700/90 |
| 2008/0231121 A1* | 9/2008 | Yang | H01R 13/6658 307/131 |
| 2009/0013210 A1* | 1/2009 | McIntosh | H04L 12/2697 714/4.1 |
| 2009/0027847 A1* | 1/2009 | Li | H01R 13/514 361/679.41 |
| 2009/0080278 A1* | 3/2009 | Schoenfeld | G11C 5/14 365/222 |
| 2009/0134716 A1* | 5/2009 | Kitamura | H01R 25/006 307/149 |
| 2009/0149973 A1* | 6/2009 | Keller | G05B 15/02 700/90 |
| 2009/0195349 A1* | 8/2009 | Frader-Thompson | G01D 4/002 340/3.1 |
| 2009/0243391 A1* | 10/2009 | Susong, III | H02J 1/06 307/66 |
| 2009/0251127 A1* | 10/2009 | Kim | G01R 22/063 324/76.11 |
| 2009/0263704 A1* | 10/2009 | Batra | H01M 2/1016 429/61 |
| 2009/0289501 A1* | 11/2009 | Garb | G06F 1/266 307/39 |
| 2009/0307505 A1* | 12/2009 | Robertson | G06F 1/266 713/300 |
| 2010/0014205 A1* | 1/2010 | Gerlach | H02H 9/042 361/111 |
| 2010/0019575 A1* | 1/2010 | Verges | H02J 3/14 307/38 |
| 2010/0044195 A1* | 2/2010 | Chiang | G06F 1/266 200/175 |
| 2010/0079001 A1* | 4/2010 | Lee | G06F 1/266 307/40 |
| 2010/0085894 A1* | 4/2010 | Johnson | H02G 3/00 370/254 |
| 2010/0096925 A1* | 4/2010 | Lee | H02J 13/0075 307/38 |
| 2010/0148581 A1* | 6/2010 | Gupta | B60L 1/003 307/30 |
| 2010/0152912 A1* | 6/2010 | Huang | G06F 1/266 700/295 |
| 2010/0164299 A1* | 7/2010 | Lee | H02J 3/14 307/115 |
| 2010/0191487 A1* | 7/2010 | Rada | G05F 1/70 702/60 |
| 2010/0238003 A1* | 9/2010 | Chan | G01D 4/004 340/538 |
| 2010/0250015 A1* | 9/2010 | Flikkema | G06Q 10/10 700/295 |
| 2010/0251157 A1* | 9/2010 | Wendt | H05B 37/0218 715/771 |
| 2011/0058299 A1* | 3/2011 | Simi | H02H 9/042 361/111 |
| 2011/0098867 A1* | 4/2011 | Jonsson | G01D 4/002 700/295 |
| 2011/0140612 A1* | 6/2011 | Mohan | H05B 37/0218 315/149 |
| 2011/0284726 A1* | 11/2011 | Leinen | H05B 37/0218 250/214 D |
| 2011/0310533 A1* | 12/2011 | Cosley | H02B 1/32 361/632 |

\* cited by examiner

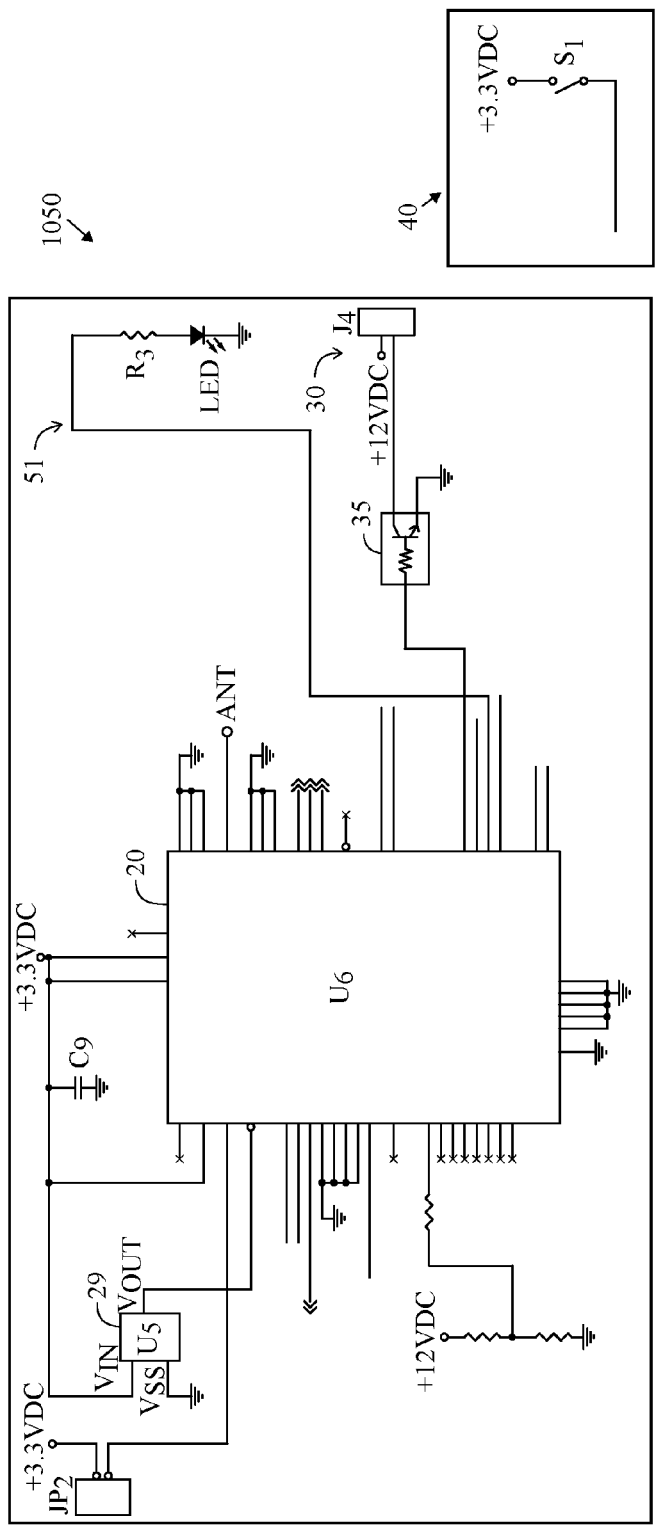
FIG. 4
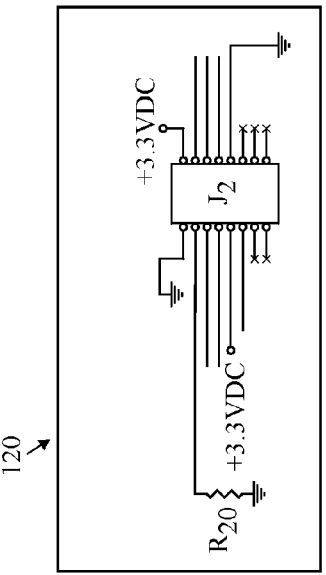
FIG. 4A
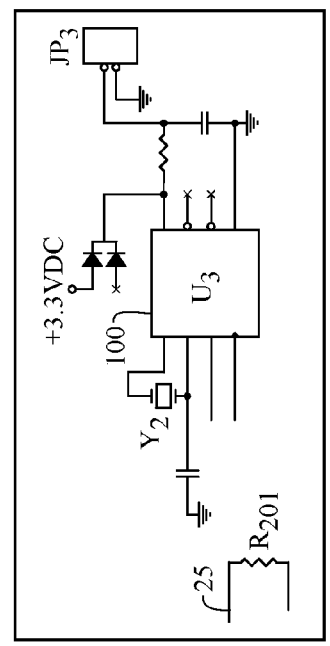
FIG. 6
FIG. 5

US 9,705,330 B1

SYSTEM, METHOD AND APPARATUS FOR MONITORING AND CONTROLLING ELECTRICAL POWER USAGE

CROSS REFERENCES TO RELATED APPLICATIONS

The Present Application is a continuation application of U.S. patent application Ser. No. 13/772,337, filed on Feb. 20, 2013, which is a continuation-in-part application of U.S. patent application Ser. No. 13/269,531, filed on Oct. 7, 2011, now abandoned, which claims priority to U.S. Provisional Patent Application No. 61/391,663, filed on Oct. 10, 2010, and is a continuation-in-part Application of U.S. patent application Ser. No. 13/162,564, filed on Jun. 16, 2011, now U.S. Pat. No. 8,093,751, issued on Jan. 10, 2012, which is a continuation application of U.S. patent application Ser. No. 12/878,040, filed on Sep. 9, 2010, now U.S. Pat. No. 7,964,989, issued on Jun. 21, 2011, which claims priority to U.S. Provisional Patent Application No. 61/361,402, filed on Jul. 3, 2010, all of which are hereby incorporated by reference in their entireties.

STATEMENT REGARDING FEDERALLY SPONSORED RESEARCH OR DEVELOPMENT

Not Applicable

BACKGROUND OF THE INVENTION

Field of the Invention

The present invention generally relates to monitoring, measuring and controlling power to furniture having an electrically powered featured. More specifically, the present invention relates to a system, method and apparatus for monitoring, measuring and controlling power to furniture having an electrically powered feature.

Description of the Related Art

The prior art discusses various method and systems for controlling power to an electrically power device.

One example is Dresti et al., U.S. Pat. No. 6,642,852 for a Remote Control Device With Appliance Power Awareness which discloses placing a device in a desired powered state through use of a infrared remote with radiofrequency capabilities.

Another is Lou et al, U.S. Patent Publication Number 2007/0115695 for a Power Supply With Low Standby Loss.

Yet another is Ewing et al., U.S. Pat. No. 7,171,461 for a Network Remote Power Management Outlet Strip.

Yet another is Lee et al., U.S. Publication Number 2010/0079001 for a Outlet Switch Socket Device.

The prior art fails to disclose a system and method for remotely monitoring and controlling power to furniture having an electrically powered feature.

BRIEF SUMMARY OF THE INVENTION

The present invention provides a system and method for monitoring and controlling power to an electrically powered device. The present invention provides an effective component for power savings, control and customization for commercial and residential buildings.

The present invention is a system for power control with remote Wi-Fi management using web based user interfaces accessible by a home PC, an office laptop or a smartphone such as an iPHONE available from Apple, Inc. The system is applicable to commercial and residential buildings. The features afforded to end-users (commercial building managers or homeowners) by the present invention allow for substantial reduction in energy consumption without having to rewire a building.

The present invention is designed and positioned as an easy to use and safe enhancement for controlling power to furniture having electrical powered features by building managers, information technology managers and homeowners. The present invention relies on existing protocols to adhere to all necessary safety and regulatory requirements.

One aspect of the present invention is system for monitoring and controlling electrical power to furniture. The system comprises at least one piece of furniture, a power control assembly, and a controller. The at least one piece of furniture hs an electrically-powered feature. The power control assembly comprises a processor configured to monitor and measure a power usage through the assembly, and a transceiver for receiving commands to the assembly and for transmitting power usage data from the assembly. The power control assembly is integrated into the piece of furniture and is in electrical communication with the electrically-powered feature. The controller transmits a plurality of commands to the power control assembly. A command of the plurality of commands from the controller can control electrical power to the electrically powered feature through the processor of the assembly which is configured to control electrical power to the electrically powered feature. The controller receives power usage data for the electrically-powered feature from the transceiver of the power control assembly.

The furniture is preferably modular furniture (such as a cubicle) and the electrically powered feature is at least one of lighting or a power outlet. Alternatively, the furniture is a lectern and the electrically powered feature is at least one of lighting or a power outlet. Alternatively, the furniture is a charging cart and the electrically powered feature is at least one of lighting or a power outlet.

Another aspect of the present invention is a power control assembly for monitoring and controlling electrical power to a piece of furniture. The assembly comprises an input connection to receive power, an output connection to distribute power to an electrically powered feature of the cubicle, means for controlling power to the output connection, a processor configured to instruct the power controlling means to enable electrical power to the output connection and to disable electrical power to the output connection, and a transceiver for receiving a plurality of commands to the assembly and for transmitting power usage data from the assembly. The processor is also configured to monitor and measure a power usage through the assembly. The power controlling means is electrically positioned between the output connection and the input connection. The transceiver is in electrical communication with the processor. A command of the plurality of commands can control electrical power to the electrically powered device through the processor of the assembly. The power control means is preferably a latch relay or an electro-mechanical relay. Alternatively, the power control means is an electrical relay.

Yet another aspect of the present invention is a method for monitoring and controlling electrical power to a piece of furniture. The method includes monitoring and measuring a power usage of at least one electrically powered feature of a piece of furniture integrated with a power control assembly. The method also includes transmitting the power usage of the electrically powered feature to a remote controller. The method also includes transmitting a command from the remote controller over a network, the command to disable power to the electrically powered feature. The method also includes receiving the command at a transceiver of the power control assembly. The method also includes communicating the command from the transceiver to a processor of the power control assembly. The method also includes switching power from an enabling state to a disabling state to disable power to the electrically powered feature. The method also includes transmitting a response to the remote controller from the transceiver of the power control assembly, the response updating the status of the electrically powered feature. The method also includes receiving the response from the power control assembly over the network at the remote controller.

The method further includes storing the power usage data by one of hour, day, week, month and year.

The method preferably uses a WiFi communication format.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 4 is a circuit diagram of power control assembly utilized with the system and method for monitoring and controlling electrical power usage to furniture with an electrically powered feature.

FIG. 4A is a circuit diagram of a user switch utilized with the system and method for monitoring and controlling electrical power usage to furniture with an electrically powered feature.

FIG. 5 is a circuit diagram of a component utilized with the system and method for monitoring and controlling electrical power usage to furniture with an electrically powered feature.

FIG. 6 is a circuit diagram of a component utilized with the system and method for monitoring and controlling electrical power usage to furniture with an electrically powered feature.

DETAILED DESCRIPTION OF THE INVENTION

Figure 1:
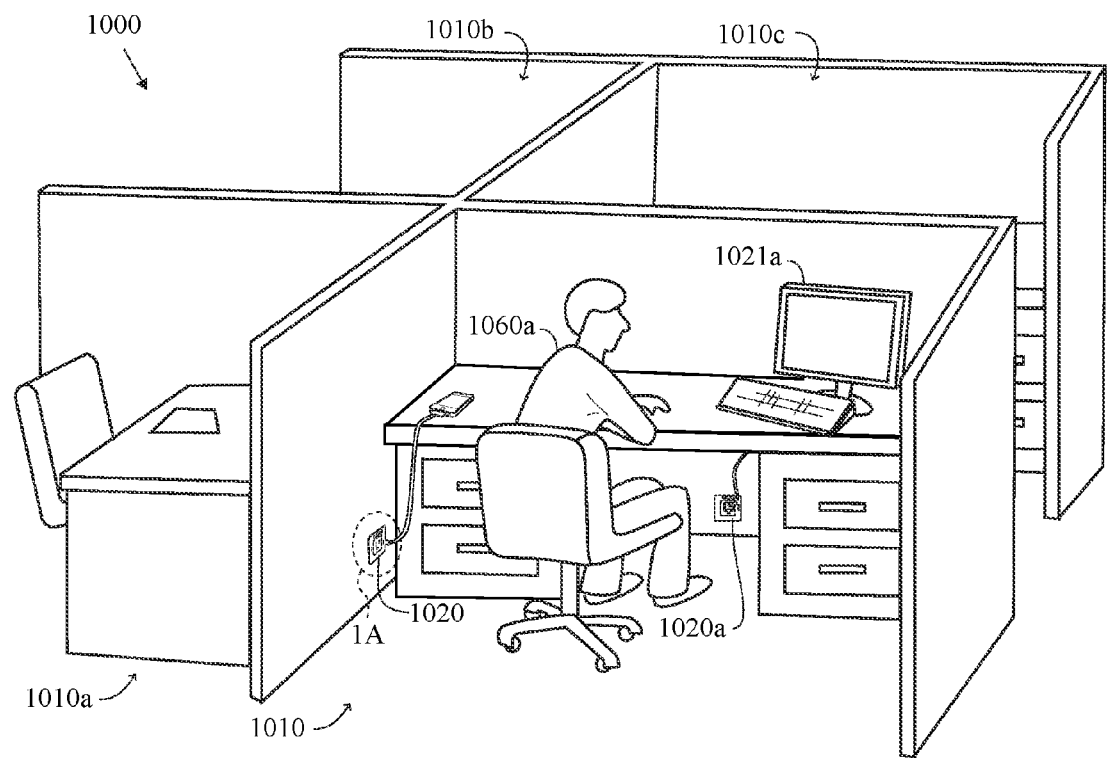
FIG. 1 is an illustration of a cubicle with an electrically powered feature integrated with a power control assembly.
Figure 1A:
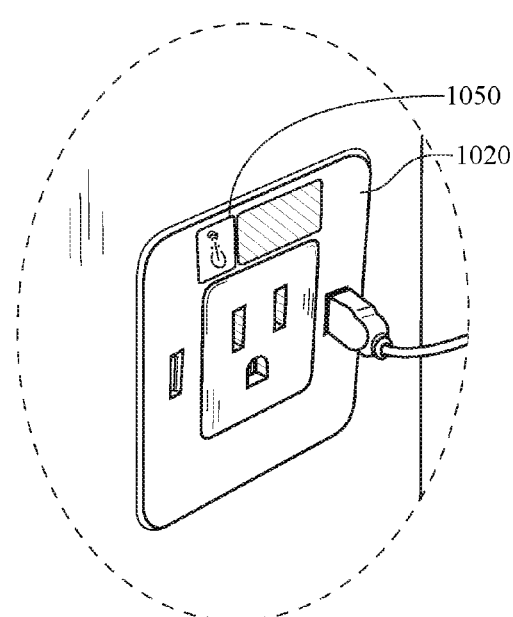
FIG. 1A is an isolated view of circle 1A of FIG. 1 showing a power outlet of the cubicle.

A preferred embodiment of a system 1000 utilized for monitoring and controlling electrical power usage to furniture with an electrically powered feature is shown in FIGS. 1 and 1A, in the form of a cubicle 1010 having a power outlet 1020. The power outlet 1020 is controlled by a power control assembly 1050, which is integrated into the cubicle 1010. A smartphone 1021 of a worker 1060*a* is plugged into the power outlet connection 1020. A second power outlet 1020*a* is also controlled by the power control assembly 1050. A computer 1021*a* is connected the second power outlet 1020*a*. The power control assembly 1050 prefeably controls power to the entire cubicle 1010, controlling the power outlets 1020 and the lighting.

Figure 2:
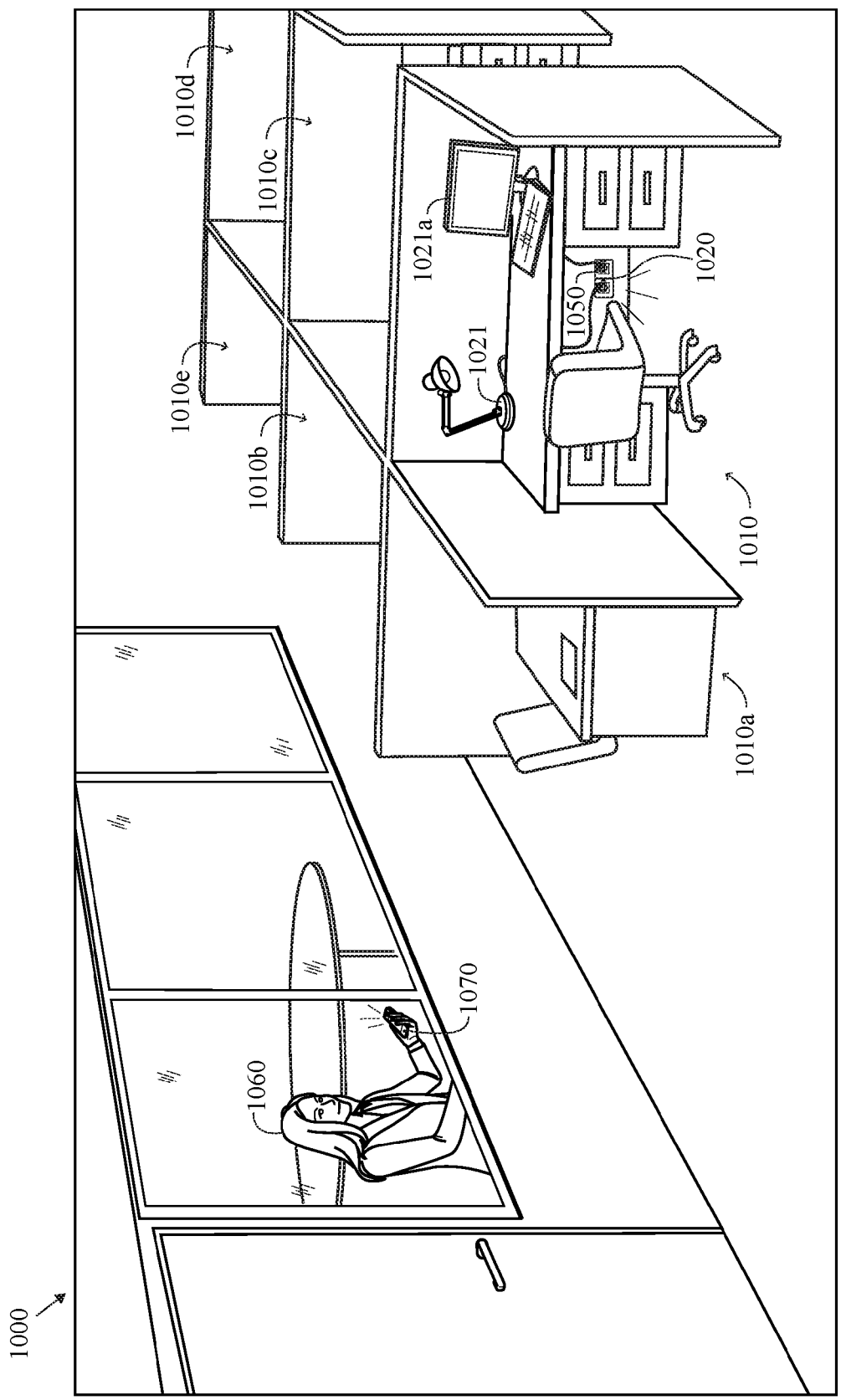
FIG. 2 is an illustration of a system for monitoring and controlling electrical power usage to furniture with an electrically powered feature integrated with a power control assembly.
Figure 2A:
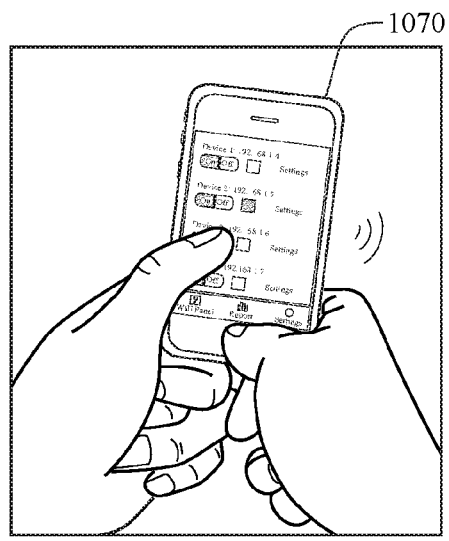
FIG. 2A is an isolated view of a controller of the system for monitoring and controlling electrical power usage to furniture with an electrically powered feature integrated with a power control assembly shown in FIG. 2.
Figure 2B:
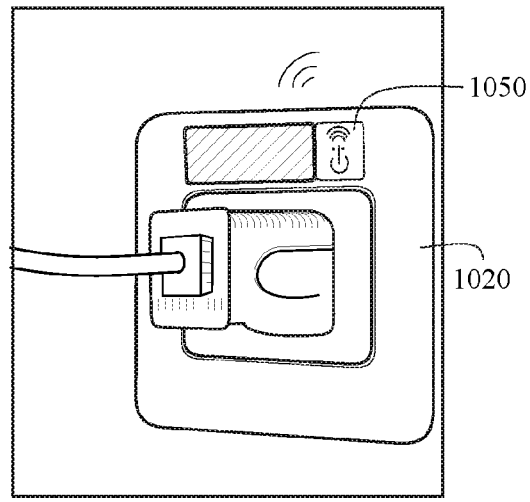
FIG. 2B is an isolated view of a power outlet of the system for monitoring and controlling electrical power usage to furniture with an electrically powered feature integrated with a power control assembly shown in FIG. 2.

Another illustration of a system 1000 utilized for monitoring and controlling electrical power usage to furniture with an electrically powered feature is shown in FIGS. 2, 2A and 2B, in the form of a cubicle 1010 having a power outlet 1020. The power outlet 1020 is controlled by a power control assembly 1050, which is integrated into the cubicle 1010. A controller 1070 of a user 1060 is utilized to monitor and control power to the cubicle 1010 with an electrically powered feature. A power outlet 1020, an electrically powered feature, is controlled by the power control assembly 1050. A computer 1021*a* is also connected the second power outlet 1020. The power control assembly 1050 prefeably controls power to the entire cubicle 1010, controlling the power outlets 1020 and the lighting. The user 1060 controls the power to the cubicle 1010 from a distance using the touch screen commands on the controller (smartphone) 1070. A WiFi signal is sent from the smartphone 1070 and received at the antenna, not shown, of the transceiver of the power control assembly 1050. The WiFi signal instructs the microprocessor of the power control assembly 1050 to deactivate the electrical power to the table lamp 1021.

Figure 3:
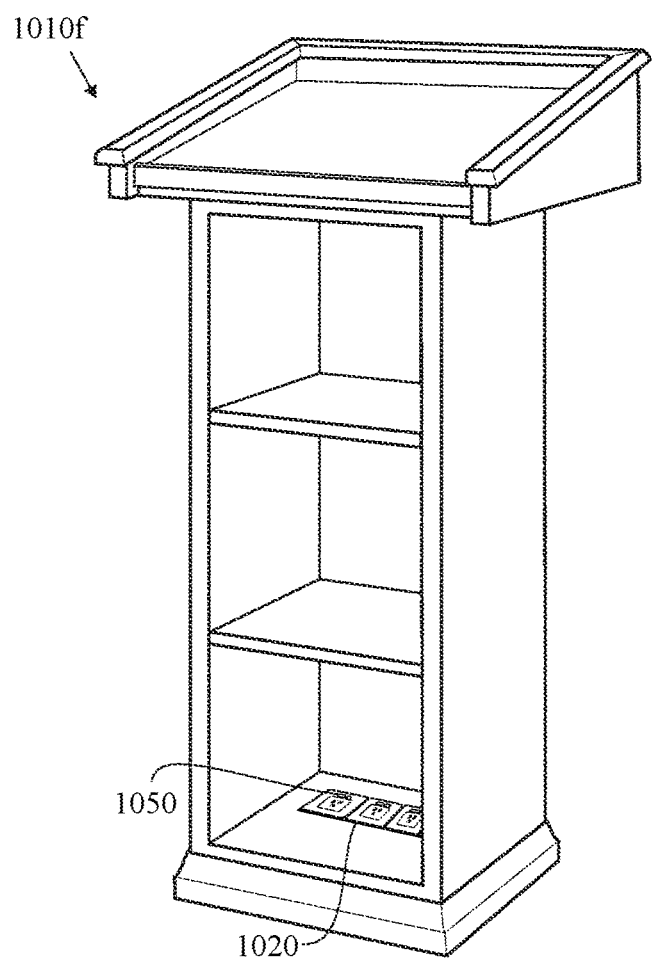
FIG. 3 is an illustration of a lectern with an electrically powered feature integrated with a power control assembly.
Figure 8:
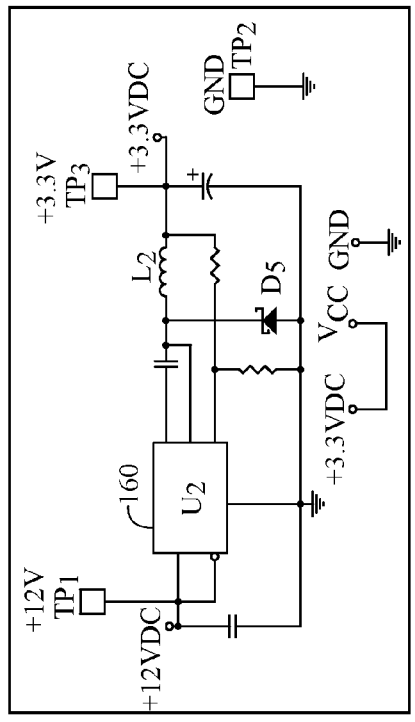
FIG. 8 is a circuit diagram of a component utilized with the system and method for monitoring and controlling electrical power usage to furniture with an electrically powered feature.
Figure 7:
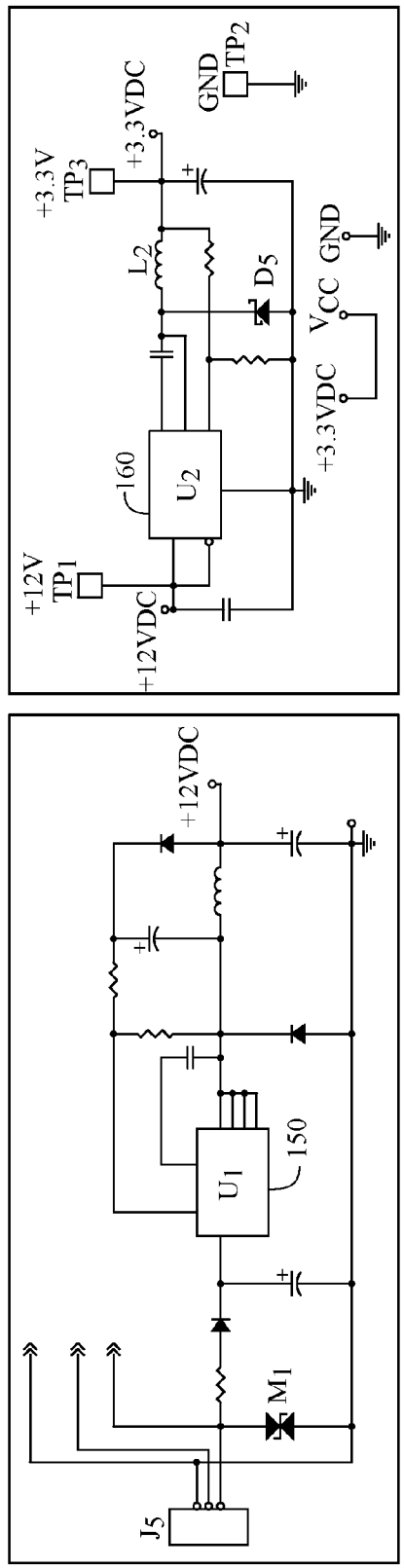
FIG. 7 is a circuit diagram of a component utilized with the system and method for monitoring and controlling electrical power usage to furniture with an electrically powered feature.
Figure 9:
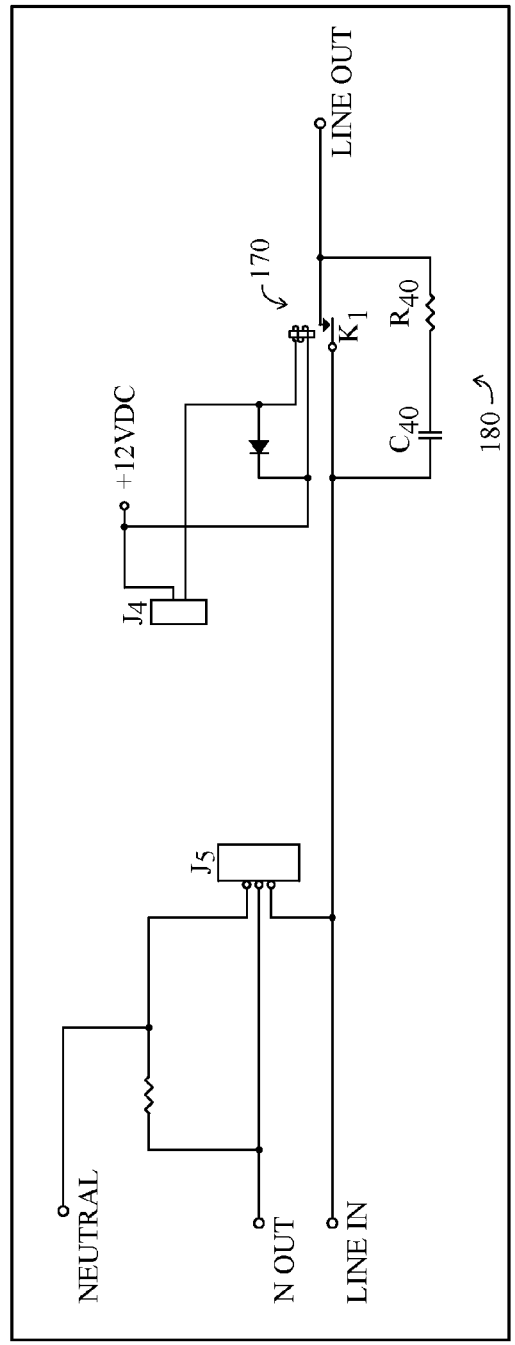
FIG. 9 is a circuit diagram of a component utilized with the system and method for monitoring and controlling electrical power usage to furniture with an electrically powered feature.
Figure 10:
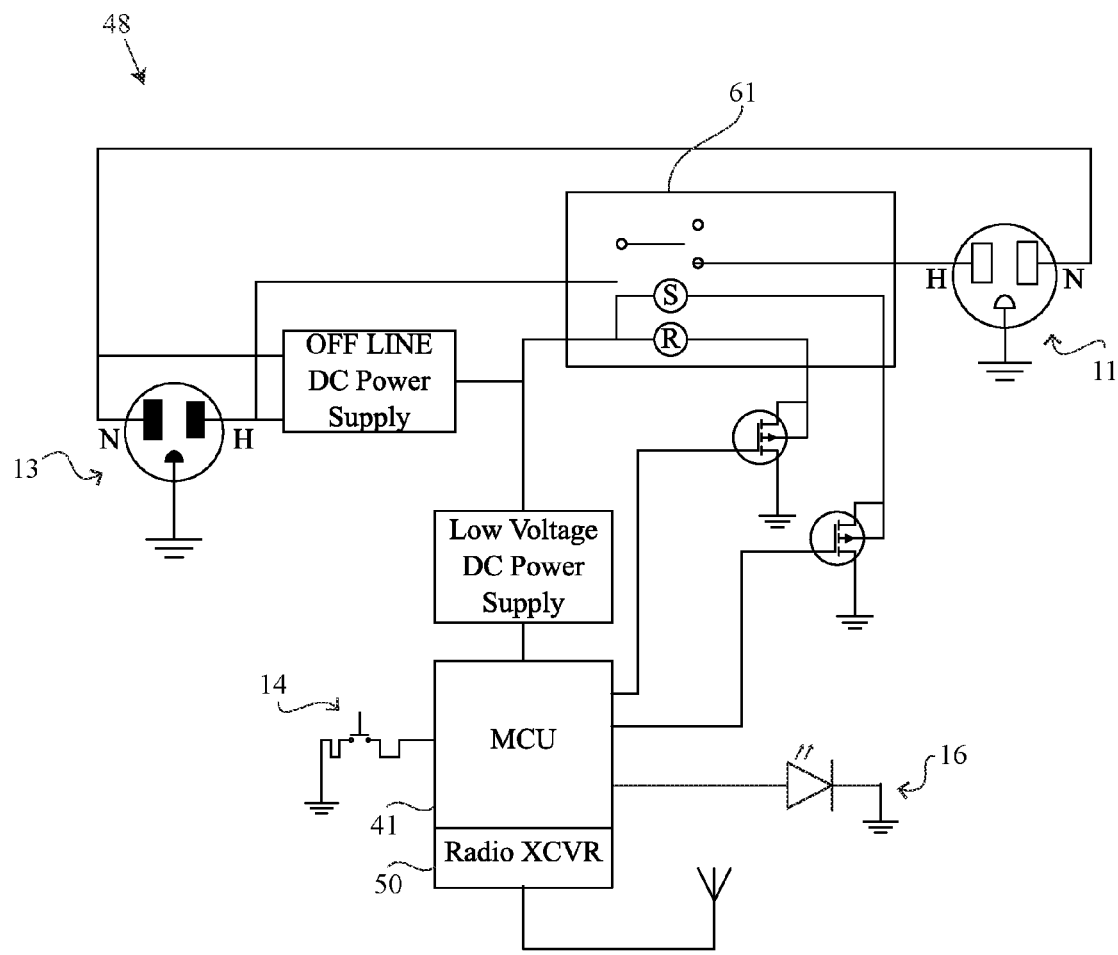
FIG. 10 is a circuit diagram of a component utilized with the system and method for monitoring and controlling electrical power usage to furniture with an electrically powered feature.

FIG. 3 illustrates yet another embodiment of a component of the system for monitoring and controlling electrical power usage to furniture with an electrically powered feature. A lectern 1010a has a power outlet 1020 controlled by a power control assembly 1050. As discussed above with reference to the cubicle 1010, the power to the lectern 1010a is monitored and controlled by the power control assembly 1050, allow for a remote controller 1070 (not shown) to be monitor and control power.

FIGS. 4-10 illustrate circuit diagrams of components of the system for monitoring and controlling electrical power usage to furniture with an electrically powered feature.

FIG. 4 a circuit diagram of the power control assembly 1050. The power control assembly 1050 comprises at least a radio transceiver, a microprocessor, a switch, and a power converter. Additionally, light-emitting diodes (LED) provide status indication.

The plug 13 is used to receive alternating current (AC) power, and the switch 61 is connected in between the socket 11 and the plug 13.

The microprocessor receives direct current (DC) power, decodes a control signal from a remote control, such as a handheld device, via the radio transceiver, and then controls the switch based on the decoded control signal.

The switch is preferably a latching relay controlled by the microprocessor, according to the control signal received from the remote control device. Alternatively, the switch is an electro-mechanical relay. Yet alternatively, the switch is an electrical The latching relay minimizes the power usage of the electrical device connected to the apparatus 10, independent of the state of the switch 61.

Further embodiments of the present invention include additional onboard energy storage, with sensing or measuring capabilities, in various form factors embedded or interfaced with various electrical. Additional embodiments of the present invention include combining a single or multiple energy harvesting sources to provide power to control the relay.

Figure 11:
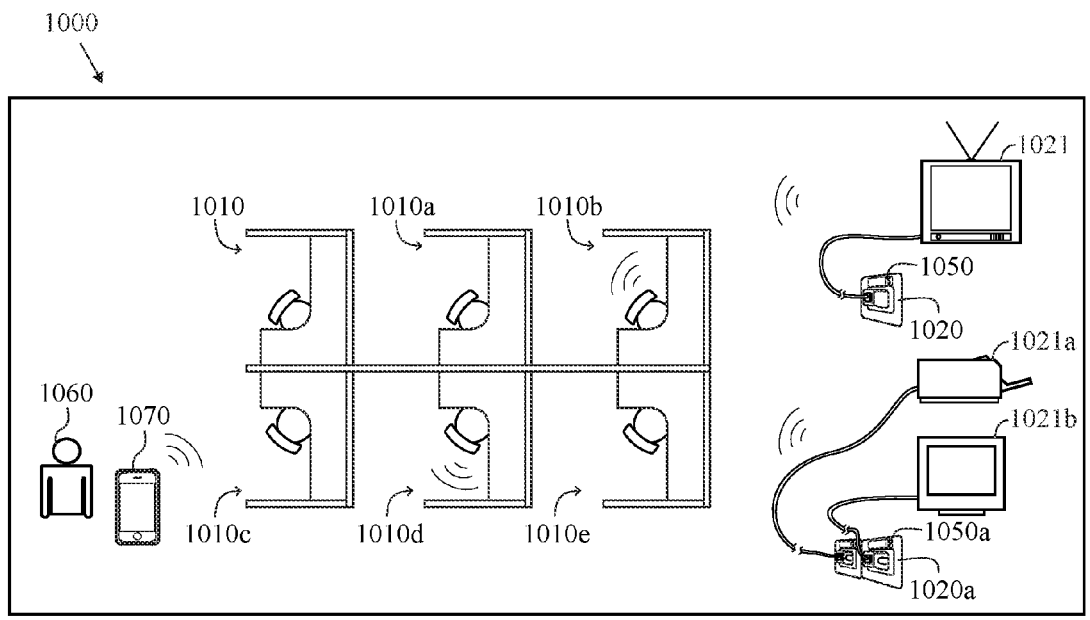
FIG. 11 is a block diagram of a system for monitoring and controlling electrical power usage to furniture with an electrically powered feature.
Figure 11A:
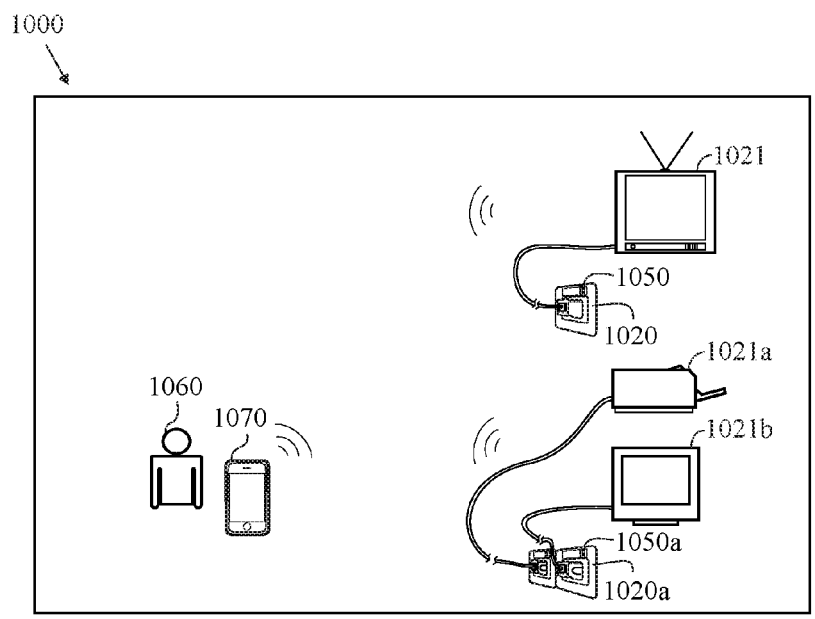
FIG. 11A is a block diagram of a system for monitoring and controlling electrical power usage to furniture with an electrically powered feature.
Figure 12:
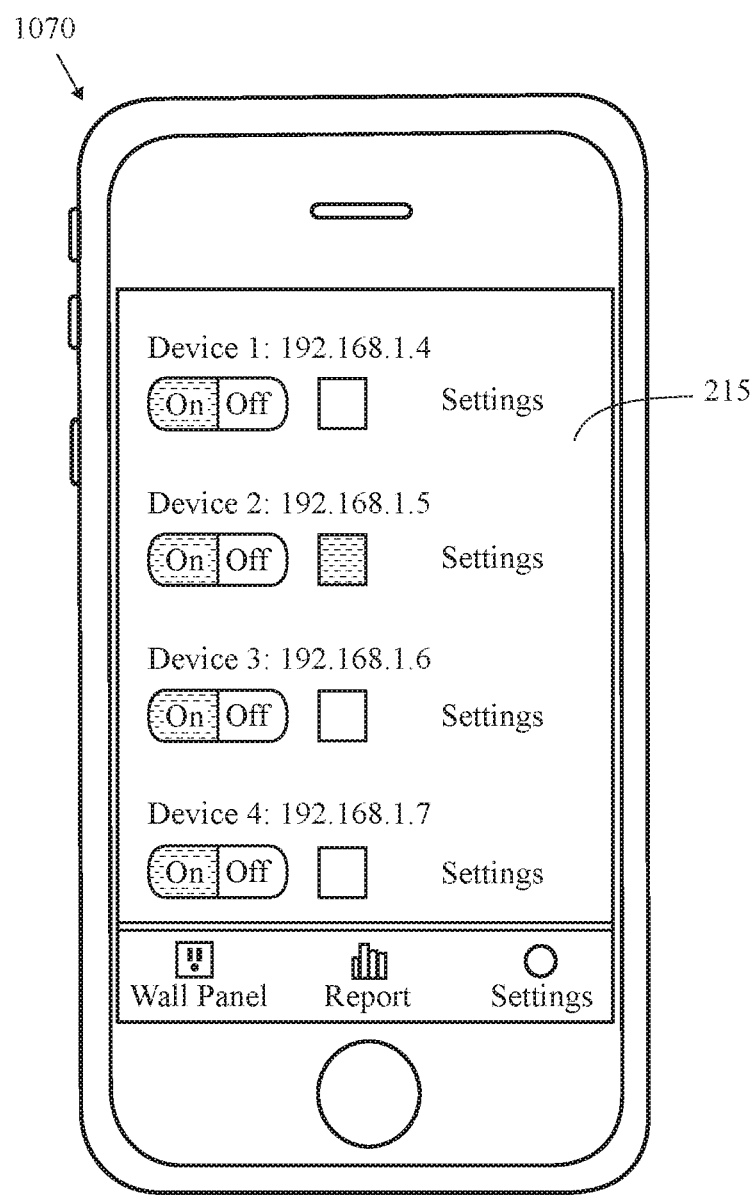
FIG. 12 is a front view of a smart phone for use with a system and method for monitoring and controlling electrical power usage to furniture with an electrically powered feature.

A system 1000 of the preferred embodiment is shown in FIGS. 11 and 11A. Each of a plurality of cubicles 1010, 1010a, 1010b, 1010c, 1001d and 1010e has power control assembly 1050 for controlling an electrically powered feature of the cubicle. A television 1021, a printer 1021a and a desktop computer 1021b are controlled by power control assemblies 1050 through an outlet 1020. A user 1060 controls power to the cubicles 1010, 1010a, 1010b, 1010c, 1001d and 1010e from a distance using the touch screen commands on a touch screen display 215 of the smartphone 1070, as shown in FIG. 12. A WiFi signal is sent from the smartphone 1070 and received at the antenna 50, not shown in FIG. 11, of the transceiver of the power control assembly 1050. The WiFi signal instructs the microprocessor 41 of the power control assembly 1050 to deactivate the electrical power to the cubicles 1010, 1010a, 1010b, 1010c, 1001d and 1010e.

The power control assembly 1050 permits the user to configure the power control assembly 1050 out of the box using a web user interface (WebUI), a personal computer ("PC") program or a WiFi enabled hand held device (smartphone) via ad-hoc wireless, allowing the user to program in home network information, such as the wireless router SSID (Service Set Identifier) and security keys, as necessary for web connectivity.

The WebUI is preferably hosted on the power control assembly 1050 and is accessible via interconnected network devices. The WebUI, PC program or WiFi enabled hand held is addressable via the assigned IP address of the power control assembly 1050. The power control assembly 1050 can be controlled from various devices such as, but not limited to, computers or mobile handhelds. In a typical network, a router and the access point provide the wireless connectivity between the power control assembly 1050 and the remote, such as a smartphone 1070. In an alternative embodiment of the system, the mobile handheld device 1070 wirelessly communicates directly with the antenna of the power control assembly 1050 preferably using a WiFI communication protocol.

FIG. 12 shows a smartphone 1070 displaying touch screen commands of an application for controlling power to cubicles having electrically powered features.

The first installed power control assembly 1050 is preferably the master power control assembly 1050 and monitors the network for any additional apparatus 10b. When a new apparatus 10b is detected on the network, the first installed power control assembly 1050 remotely manages other power control assembly 1050 using a single WebUI, PC program or WiFi enabled hand held. The user will either: a) logon to the original power control assembly 1050 and have selectable tabs and additional options to manage all of the power control assembly 1050 on the network; or b) manage each power control assembly 1050 discretely using individual IP addresses. Local user settings to the individual power control assembly 1050 supersede commands and/or timers from the master power control assembly 1050. The power control assembly 1050 is compatible with various web browsers such as, but not limited to, Mozilla Firefox, Microsoft Explorer and Google Chrome.

Figure 13:
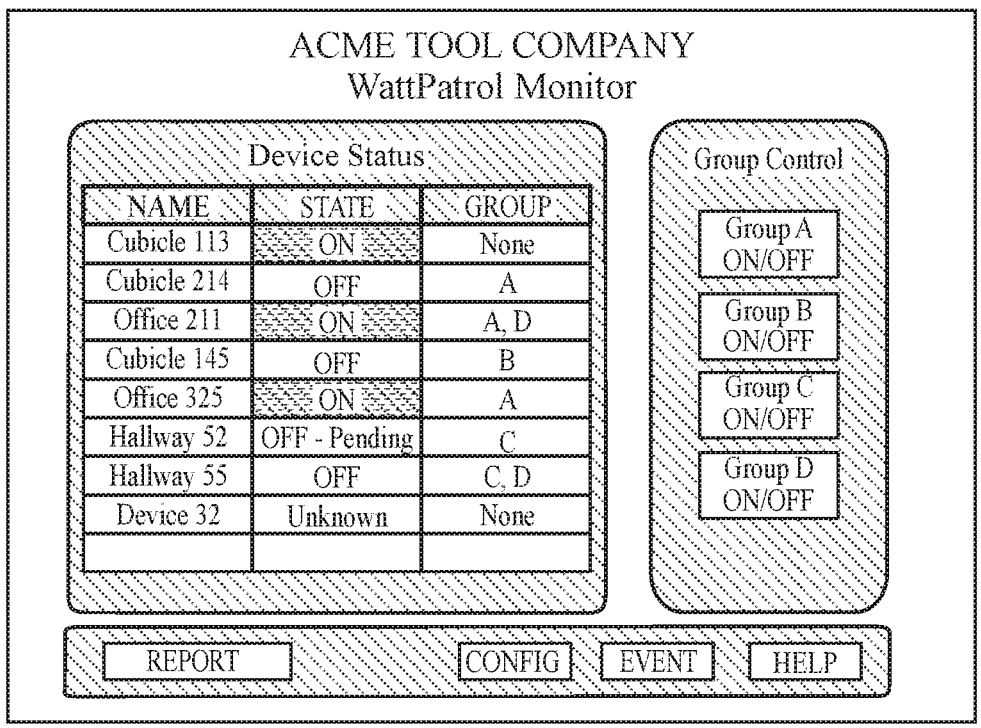
FIG. 13 is a screen view of a status chart of a system for monitoring and controlling electrical power usage to furniture with an electrically powered feature.

A simple WebUI home page allows individual management and supervision of each cubicle such as, but not limited to, setting multiple timers and toggling ON/OFF selections of multiple cubicles. An example of a web page, of a status window 190, is shown in FIG. 13. The status page 190 displays the status of the devices and users can turn devices OFF or ON from this page.

Figure 14:
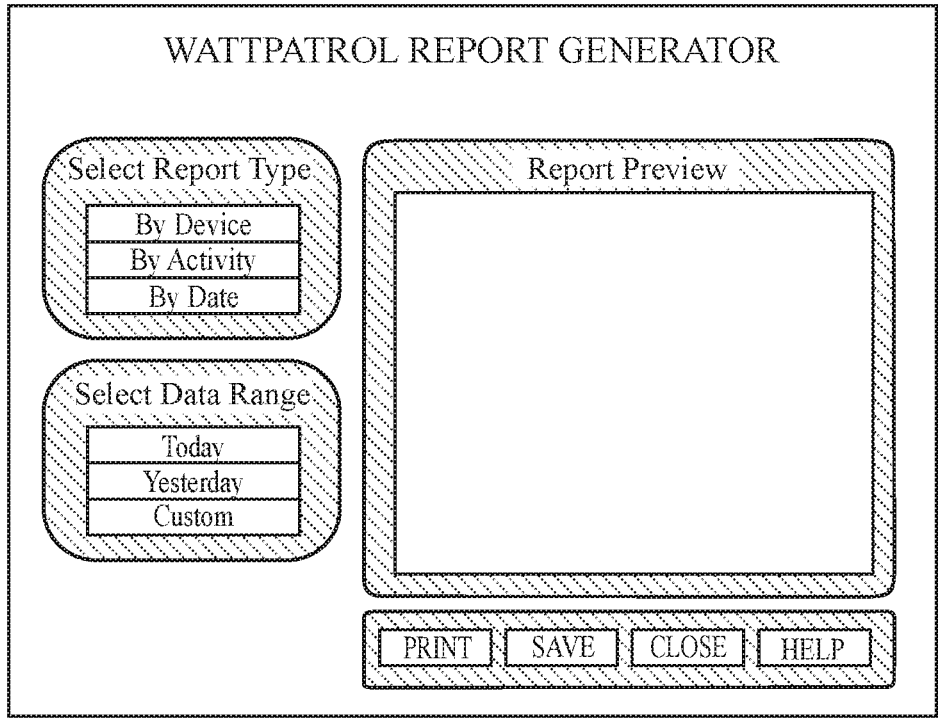
FIG. 14 is a screen view of a report generated by a system for monitoring and controlling electrical power usage to furniture with an electrically powered feature.

FIG. 14 shows another example of a web page, a report window 200 that a user can access to generate a report in order to analyze or compare the consumption of energy by devices or activities or dates.

Figure 15:
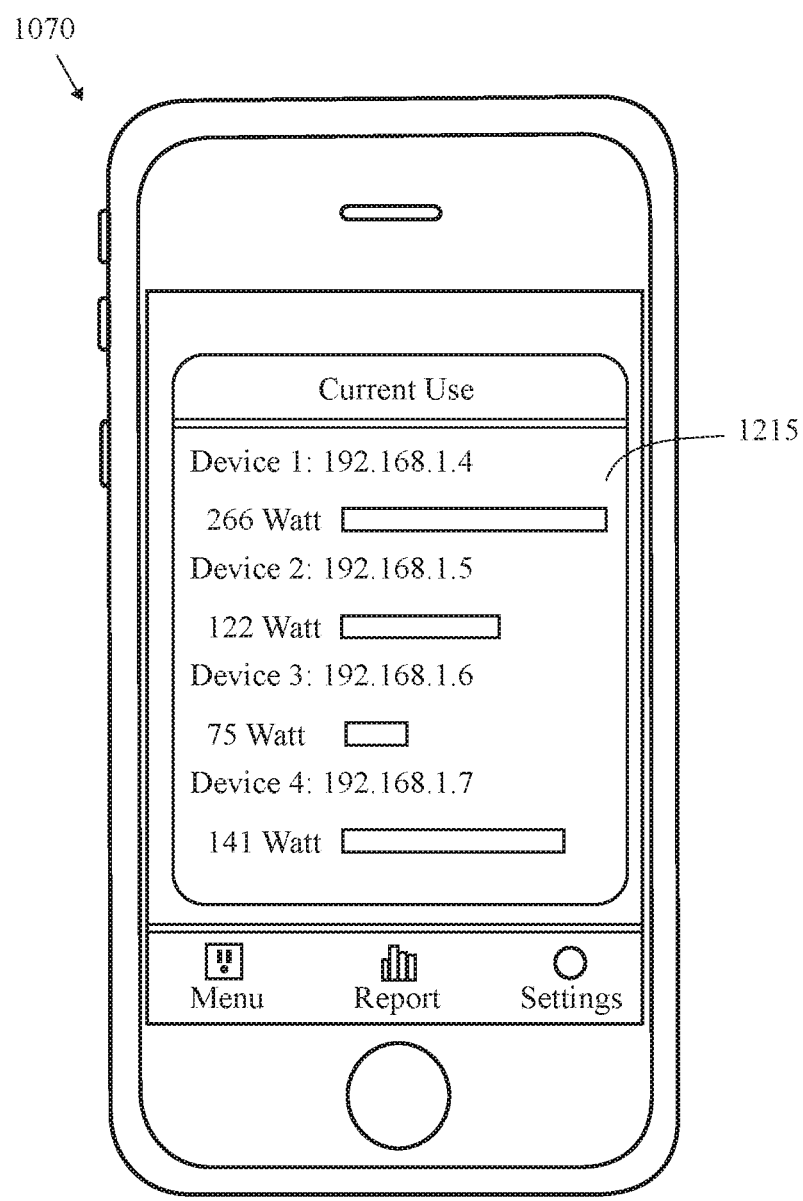
FIG. 15 is a front view of a smart phone for use with a system and method for monitoring and controlling electrical power usage to furniture with an electrically powered feature.

FIG. 15 is a screen view of an IPHONE mobile device 1070 being used as a controller of a system for controlling power to an electrically powered device. The screen 1215 shows the devices in current use and the wattage used at the current time. For example, Device 1 could be a laptop being used.

Further details of power control and monitoring is described in U.S. Pat. Nos. 7,964,989 and 8,093,751 which are hereby incorporation by reference in their entireties. Further details of power control and monitoring is described in U.S. patent application Ser. No. 13/622,399 filed on Sep. 19, 2012 for a Method, System And Apparatus For Controlling Power To A Device is hereby incorporated by reference in its entirety. Further details of power control and monitoring is described in U.S. patent application Ser. No. 13/624,970 filed on Sep. 24, 2012 for a Method, System And Apparatus For Monitoring And Measuring Power To A Device is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A system for monitoring and controlling electrical power to a cubicle, the system comprising:
   a facility having a source of electrical power;
   a cubicle having a plurality of walls;
   a plurality of electrically-powered devices positioned within the cubicle;
   a power control assembly comprising:
   a processor configured to monitor and measure data for electrical power usage through the power control assembly,
   a plurality of power outlets positioned in the plurality of walls,
   a first power outlet of the plurality of power outlets in a first wall of the plurality of walls having an alternating current socket and a USB socket,
   a second power outlet of the plurality of power outlets in a second wall of the plurality of walls,
   a relay between the source of electrical power and the plurality of power outlets wherein the relay is a latching relay, an electro-mechanical relay or an electrical relay, and
   a wireless transceiver for receiving a plurality of commands to the power control assembly and for transmitting data for electrical power usage from the power control assembly,
   wherein the power control assembly is integrated into a wall of the plurality of walls of the cubicle and in hard wired electrical communication with the source of electrical power;
   wherein each of the plurality of electrically-powered devices is connected to a power outlet of the plurality of power outlets; and
   a controller for transmitting the plurality of commands to the power control assembly;
   wherein a command of the plurality of commands from the controller can control electrical power to the plurality of electrically-powered devices through the processor of the power control assembly which is configured to control electrical power to the plurality of electrically-powered devices, and wherein the controller receives data for electrical power usage for each of the plurality of electrically-powered devices from the wireless transceiver of the power control assembly.

2. The system according to claim 1 wherein the controller is a smart phone, a computer, or a mobile phone.

3. The system according to claim 1 wherein the system utilizes an 802.11 communication format.

* * * * *